(12) United States Patent
Weigand et al.

(10) Patent No.: US 8,196,953 B2
(45) Date of Patent: Jun. 12, 2012

(54) FILM PLATE FOR AN AIRBAG COVER

(75) Inventors: Steffen Weigand, Aschaffenburg (DE); Frank Sauer, Niedernberg (DE)

(73) Assignee: Takata-Petri AG, Aschaffenburg (DE)

( * ) Notice: Subject to any disclaimer, the term of this patent is extended or adjusted under 35 U.S.C. 154(b) by 227 days.

(21) Appl. No.: 12/585,122

(22) Filed: Sep. 3, 2009

(65) Prior Publication Data

US 2010/0293824 A1 Nov. 25, 2010

Related U.S. Application Data

(63) Continuation of application No. PCT/EP2008/051444, filed on Feb. 6, 2008.

(30) Foreign Application Priority Data

Mar. 5, 2007 (DE) .......................... 10 2007 011 109

(51) Int. Cl.
*B60R 21/205* (2011.01)
*B60R 21/215* (2011.01)
(52) U.S. Cl. ..................................... 280/728.3; 280/731
(58) Field of Classification Search ............... 280/728.3, 280/731
See application file for complete search history.

(56) References Cited

U.S. PATENT DOCUMENTS

| | | | | |
|---|---|---|---|---|
| 5,741,024 A * | 4/1998 | Enders | ........................ | 280/728.3 |
| 6,003,895 A | 12/1999 | Niwa et al. | | |
| 6,047,984 A * | 4/2000 | Preisler et al. | ............. | 280/728.2 |
| 6,053,526 A * | 4/2000 | Preisler et al. | ............. | 280/728.2 |
| 6,158,764 A | 12/2000 | Preisler et al. | | |
| 6,168,187 B1 | 1/2001 | Yamada et al. | | |
| 6,209,905 B1 | 4/2001 | Preisler et al. | | |
| 6,443,484 B2 * | 9/2002 | Anglsperger | ............. | 280/728.3 |
| 6,546,659 B1 | 4/2003 | Imai et al. | | |
| 6,568,704 B2 * | 5/2003 | Iida et al. | ................... | 280/728.3 |
| 6,585,288 B2 | 7/2003 | Nishiura et al. | | |
| 6,692,016 B2 * | 2/2004 | Yokota et al. | ............. | 280/728.2 |
| 6,951,349 B2 * | 10/2005 | Yokota et al. | ............. | 280/728.2 |
| 7,000,941 B2 * | 2/2006 | Yokota et al. | ............. | 280/728.2 |
| 7,055,849 B2 * | 6/2006 | Yokota et al. | ............. | 280/728.2 |
| 7,059,628 B2 | 6/2006 | Yokota et al. | | |
| 7,097,198 B2 * | 8/2006 | Yokota et al. | ............. | 280/728.2 |
| 7,172,210 B2 * | 2/2007 | Yokota et al. | ............. | 280/728.2 |
| 7,213,833 B2 * | 5/2007 | Amamori | .................. | 280/728.3 |

(Continued)

FOREIGN PATENT DOCUMENTS

DE 295 12 551 U1 2/1996

(Continued)

OTHER PUBLICATIONS

Reasons of Rejection in JP Appln. No.: 2009-552146 dated Jan. 16, 2012.

*Primary Examiner* — Drew Brown
(74) *Attorney, Agent, or Firm* — Foley & Lardner LLP

(57) ABSTRACT

A film plate for an airbag cover is provided. The film plate is pre-formed by deep-drawing or embossing and is directly, without reinforcing elements, attachable to the airbag cover by mechanical connecting elements. The airbag cover has, at the location of the film plate, at least a partial support for the film plate and the film plate has an embossed structure on its lower side, which is visible on the upper side.

18 Claims, 6 Drawing Sheets

U.S. PATENT DOCUMENTS

2006/0202449 A1  9/2006  Yokota et al.

FOREIGN PATENT DOCUMENTS

| | | |
|---|---|---|
| DE | 296 17 721 U1 | 3/1997 |
| DE | 197 49 173 A1 | 5/1999 |
| DE | 101 00 747 A1 | 8/2001 |
| DE | 10 2004 046 866 A1 | 4/2005 |
| DE | 10 2004 046 866 A1 | 4/2005 |
| EP | 0 835 788 A1 | 4/1998 |
| JP | 02-117944 | 9/1990 |
| JP | 2001-130338 | 5/2001 |
| JP | 2001-151063 A | 6/2001 |
| JP | 2001 151063 A | 6/2001 |
| JP | 2001-239908 | 9/2001 |
| JP | 2001-354099 | 12/2001 |
| JP | 2005-104201 | 4/2005 |

* cited by examiner

FILM PLATE FOR AN AIRBAG COVER

CROSS-REFERENCE TO RELATED PATENT APPLICATIONS

This application is a Continuation of International Patent Application Number PCT/EP2008/051444, filed on Feb. 6, 2008, which claims priority of German Utility Model Application No. 10 2007 011 109.8, filed on Mar. 5, 2007, both of the foregoing applications are incorporated herein by reference in their entireties.

BACKGROUND

The invention relates to a film plate for an airbag cover.

Besides airbag covers with massive plates as decorative elements, airbag covers became known which use plates made of films. These film plates have the advantage that in case of a crash when the airbag cover is ripped open an injury is excluded by the soft film plate.

From DE 101 00 747 A1 an airbag cover with a flexible decorative plate is known. This has a comparatively soft plastic preform which is comparable to the airbag cover as well as a plastic basic layer and a film upper layer. These are connected by a hot press in a process comprising several steps. The disadvantage of this arrangement is that these plates consist of several layers, which have to be assembled in several steps and have to be attached on the airbag cover.

Furthermore, an airbag cover is known from U.S. Pat. No. 7,059,628 B2 in which a compact plate which consists for instance of metal, is attached by a snap-in connection on the airbag cover. Such a compact plate can be simpler produced in comparison to the prementioned film plates and it is also attachable in a simpler manner on the airbag cover. However the disadvantage is the risk of an injury of an occupant in case of a crash.

SUMMARY

The object of the invention is to produce a film plate in a simpler fashion and attach it to the airbag cover in a simpler fashion.

According to an exemplary embodiment of the invention, a film plate is provided as a film plate for an airbag cover which is directly attached on the airbag cover without reinforcing elements which has, at the location of the film plate, at least a partial support for the film plate. Hereby, the weight of the film plate is reduced in contrast to known film plates. Compared to an arrangement with a compact plate, the weight of the airbag cover is also reduced since the often times elaborate support of a heavy plate is omitted. In comparison to steel plates or to molded plastic plates, the manufacturing costs are minimized. The lower weight of the film plate reduces the pressures of the airbag covers and connecting regions during the activation of the airbag. The pressures on the occupants are reduced in case of an OOP.

The airbag cover has exemplary the contour of a film plate at the location of the film plate. The film plate can be for instance deep-drawn or embossed hot or cold.

The film plate can be attached to the airbag cover in different ways. It is possible, to attach the film plate on the airbag cover by mechanical connecting elements.

In a first exemplary embodiment it is provided that the film plate is attachable by a snap-in connection on the airbag cover. Snap-in elements are provided at least at the outer rim of the film plate. Elastically deformable hook elements can be provided as snap-in elements, which reach beneath the airbag cover. In an exemplary embodiment the hook elements have at least two hooks pointing in the opposite direction.

Plates can also be provided as snap elements to which snap-in noses on the airbag cover are assigned.

It is provided in a second exemplary embodiment that the film plate is attachable to the airbag cover by a clamp connection. Elastically deformable fir tree-like elements can be provided as clamping elements, which reach into corresponding openings of the airbag cover.

It is provided in a further exemplary embodiment that self-supporting rims of the film plate or plates provided at these reach into corresponding slots of the airbag cover.

The mechanical connecting elements are exemplary provided in one piece at the film plate.

In a further exemplary embodiment the film plate is adhered to the airbag cover.

The film plate has exemplary a decorative element. This can be produced by different technologies. The film plate can have a colour print on its surface. The film plate can also be made of a decorative film or a galvanically produced decorative element can be provided. These manufacturing technologies are only specified as an example. Further manufacturing technologies are possible.

In a further embodiment the film plate has an embossed structure on its lower side, which is visible on the upper side.

BRIEF DESCRIPTION OF THE DRAWINGS

The invention is explained in examples on the basis of drawings.

DETAILED DESCRIPTION

Figure 1:
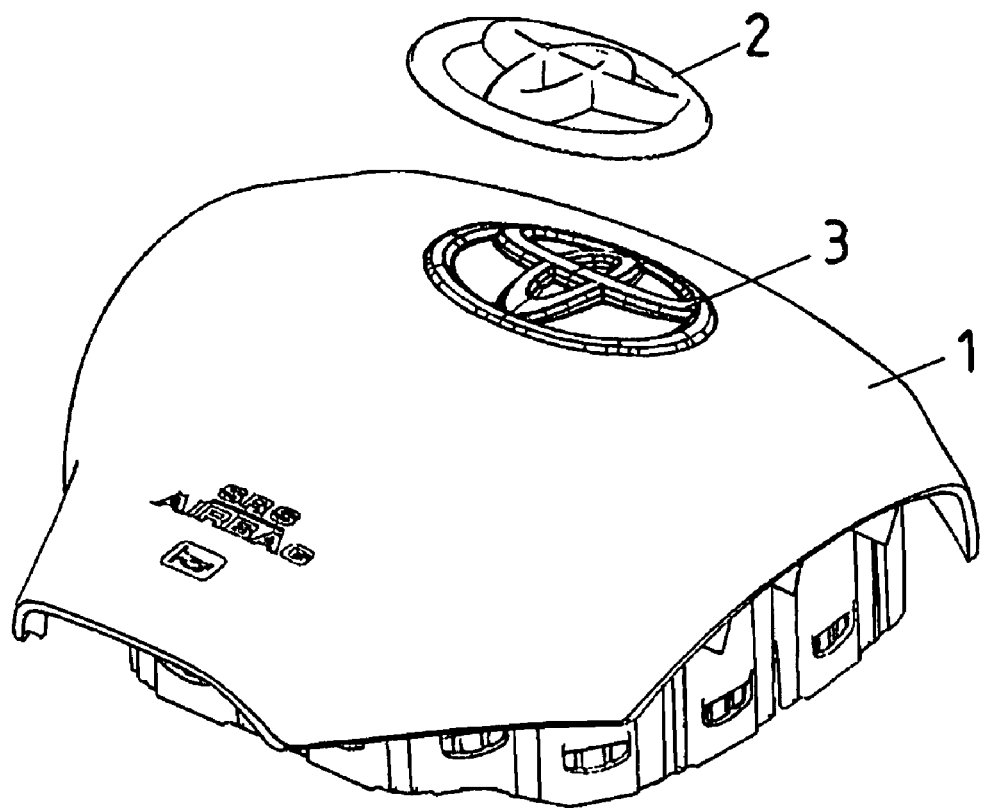
FIG. 1 shows an airbag cover cap with film plate.

In FIG. 1 an airbag cap 1 is shown in a perspective view, to which a film plate 2 is arranged. The airbag cap 1 has at the location where the film plate is provided the elevated contour 3 of the film plate so that this is completely aligned to the airbag cap. Therefore, no reinforcements for the in itself labile film plate is not required. These would also not be necessary if only single reinforcements for the film plate are provided on the airbag cap.

Figure 3:
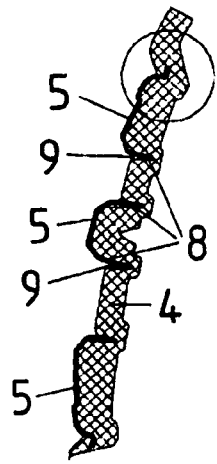
FIG. 3 shows a cross section of FIG. 2 with a first embodiment of the film plate.
Figure 2:
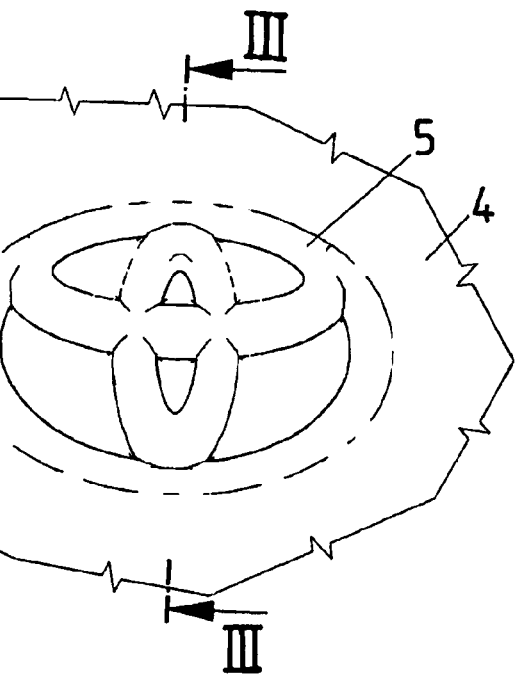
FIG. 2 shows a top view of a section of an airbag cap with a film plate.
Figure 4:
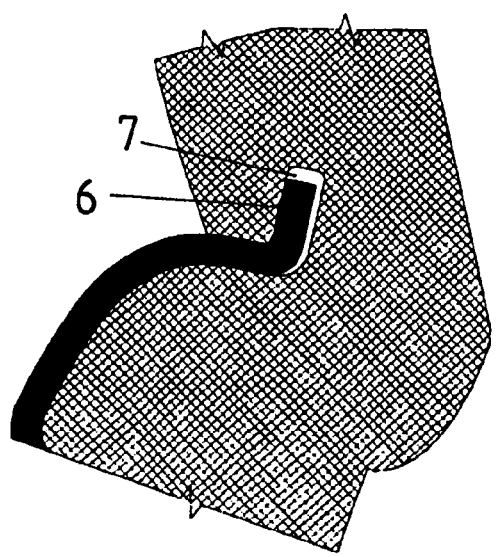
FIG. 4 shows an enlarged detail of FIG. 3.

FIG. 2 shows a section of an airbag cap 4 with a film plate 5 in a first embodiment which is recognizable in the cross section of FIG. 3. The film plate 5 has circumferential rim 6 which is bended outwardly and reaches into a likewise circumferential slot 7 of the airbag cap 4 as it is in particular recognizable from FIG. 4. Inner rims 8 of the film plate 5 reach also into slots 9 of the airbag cap 4. The film plate is attached to the airbag cap in this embodiment by adherence.

Figure 5:
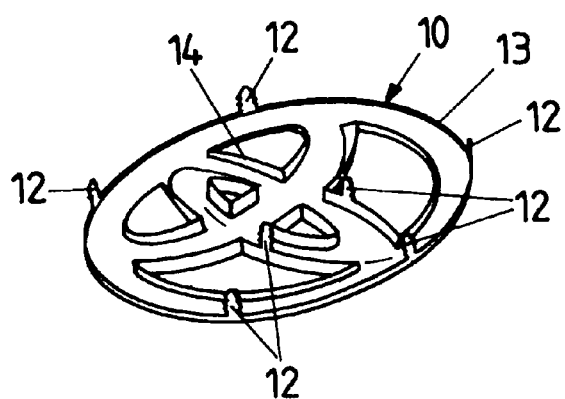
FIG. 5 shows a perspective view of the lower side of a film plate in a second embodiment.
Figure 6:
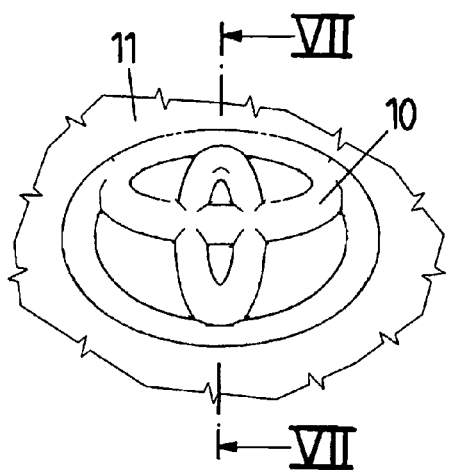
FIG. 6 shows a top view of a section of an airbag cap with a film plate according to FIG. 5.
Figure 7:
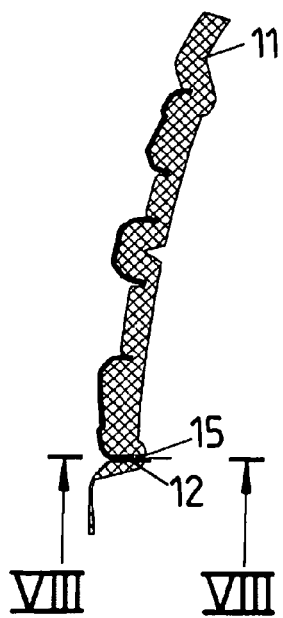
FIG. 7 shows a cross section of FIG. 6.

In the second embodiment of the film plate 10 shown in FIG. 5 fir tree-like elements 12 are provided as clamping elements for attaching the film plate on an airbag cap 11. These are provided at the circumferential outer rim 13 and also at the inner rims 14 of the film plate 10 and are formed in one piece with it. The elements 12 reach into the slots 15 of the airbag cap 11 as noticeable in FIGS. 7 and 8. From FIG. 8 it is recognizable that the elements 12 with their tooth-like sections rest against opposite sides of the slots 15. The elements 12 are broader than the slots 15 and are elastically deformed during insertion into the slots 15. After pressing the elements 12 into the slots 15 a clamp connection is available.

Figure 9:
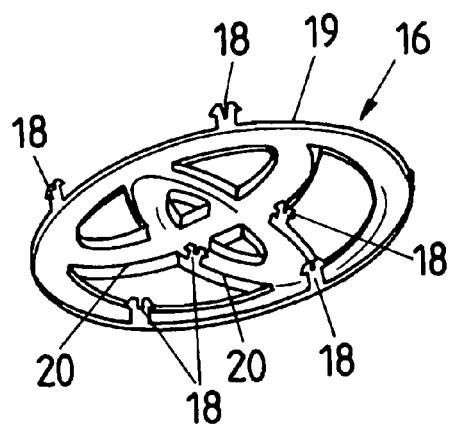
FIG. 9 shows a perspective view of the lower side of a film plate in a third embodiment.
Figure 10:
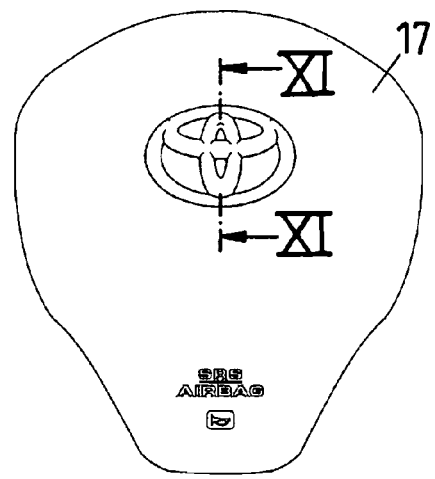
FIG. 10 shows a top view of an airbag cap with film plate according to FIG. 9.
Figure 11:
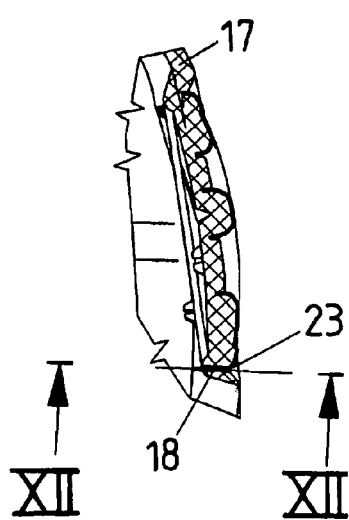
FIG. 11 shows a cross section of FIG. 10.
Figure 12:
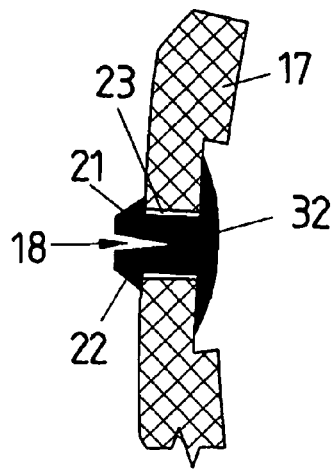
FIG. 12 shows a cross section of FIG. 11 in an enlarged scale.

In case of the third embodiment of the film plate 16 shown in FIG. 9 hook elements 18 are provided for its attachment on an airbag cap 17. These are provided at the circumferential outer rim 19 as well as at the inner rims 20 of the film plate 16 and are formed in one piece with it. The hook elements 18 have two hooks 21, 22 pointing in opposite direction (FIG. 12). These reach into slots 23 as recognizable from FIGS. 11 and 12. During the assembly of film plate 16 the hooks 21, 22 are elastically deformed by pressing them onto the airbag cap 17 so that they can be pressed through the slots 23. After the passage of the slots, the hooks 21, 22 spring back outwards and reach beneath the airbag cap 17 whereby the film plate 16 is attached on it.

Figure 13:
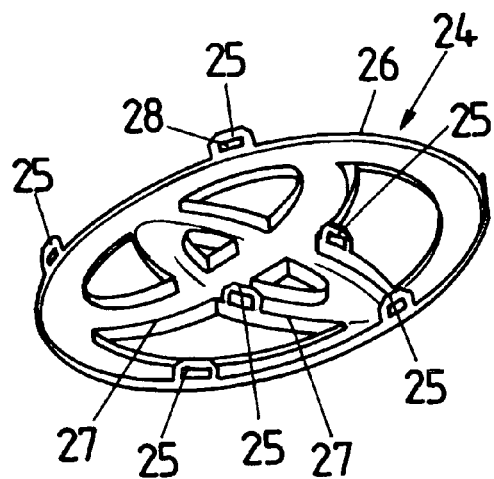
FIG. 13 shows a perspective view of the lower side of a film plate in a fourth embodiment.
Figure 14:
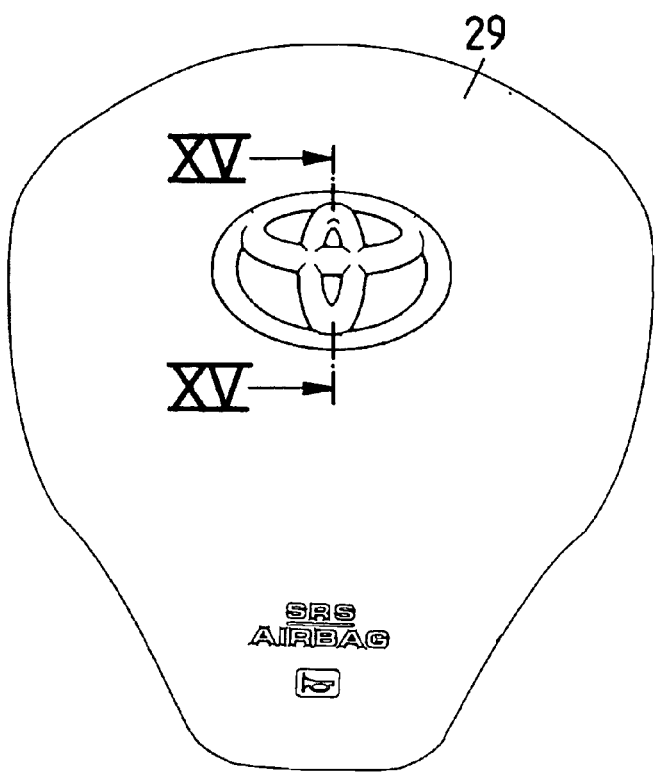
FIG. 14 shows a top view of an airbag cap with film plate according to FIG. 13.
Figure 15:
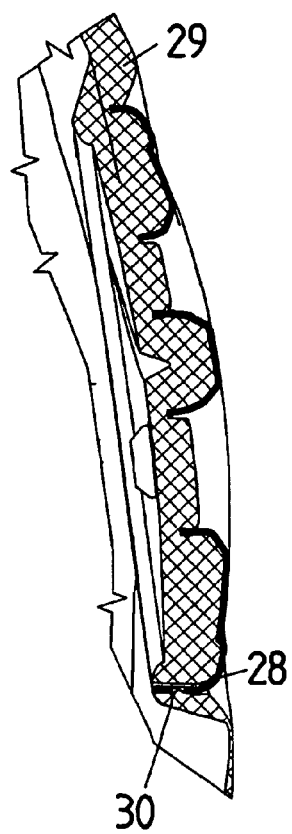
FIG. 15 shows a cross section of FIG. 14 in an enlarged scale.
Figure 16:
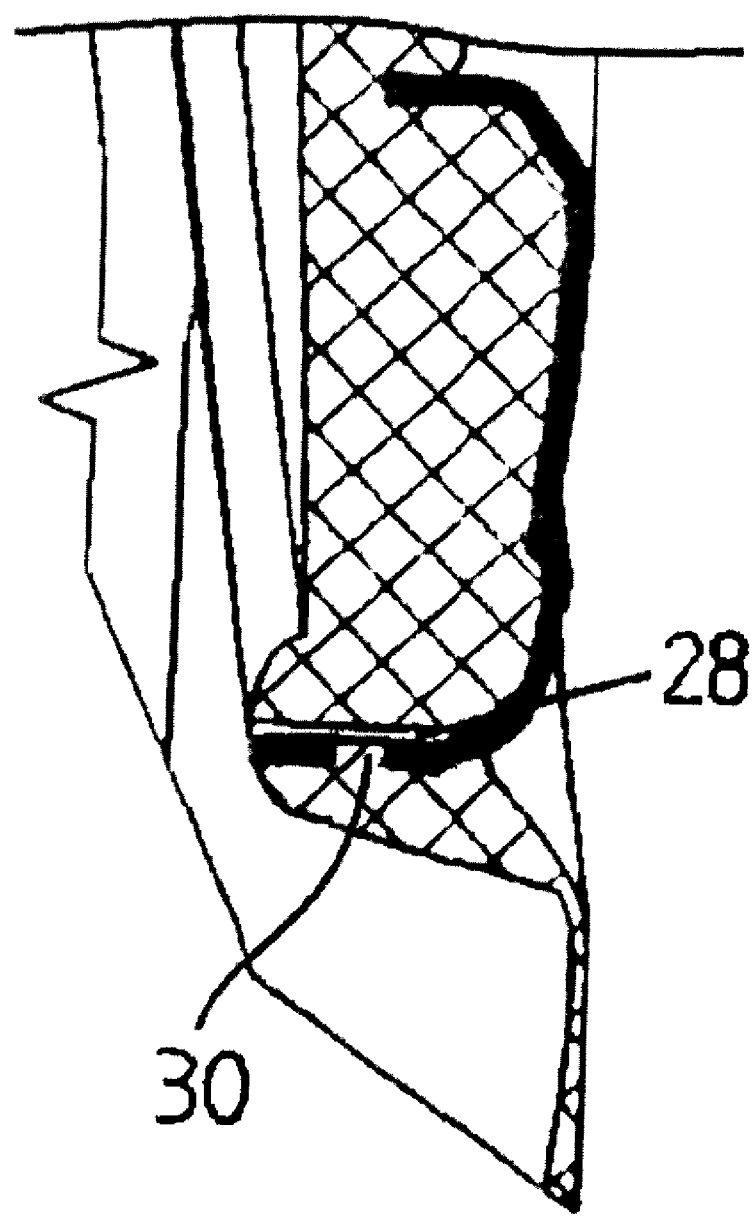
FIG. 16 shows a close-up view of the snap-in noses of FIG. 15.

The fourth embodiment of a film plate 24 is shown in FIG. 13. This has plates 25 which are provided at the circumferential outer rim 26 as well as at the inner rims 27 and are formed in one piece with the film plate 24. The plates 25 have openings 28 to which elastically deformable snap-in noses 30 (as seen in FIG. 16) are arranged. During the assembly of the film plate, the snap-in noses 30 are elastically deformed by pressing down the snaps 25. They finally snap into the openings 28, whereby the film plate is attached on the airbag cap.

Figure 8:
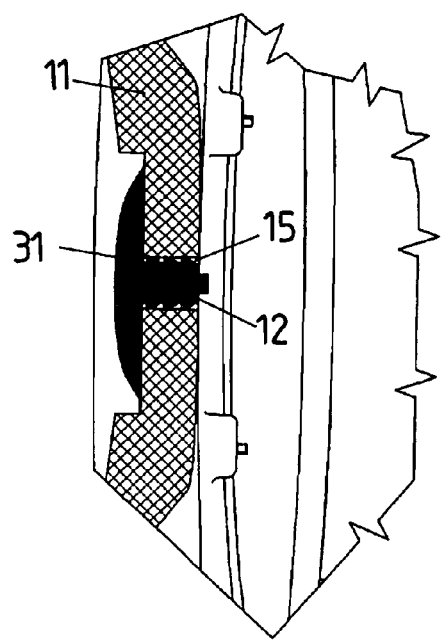
FIG. 8 shows a cross section of FIG. 7 in an enlarged scale.

In FIGS. 8 and 12 sections of the film plate are designated by the reference signs 31 and 32.

What is claimed is:

1. A film plate for an airbag cover,
    wherein the film plate is pre-formed by deep-drawing or embossing,
    wherein the film plate is directly, without reinforcing elements, attachable to the airbag cover by mechanical connecting elements,
    wherein the airbag cover has, at a location of the film plate, at least a partial support for the film plate,
    wherein the film plate has an embossed structure on its lower side, which is visible on an upper side of the film plate,
    wherein the film plate is attachable by a snap-in connection on the airbag cover, and
    wherein snap-in elements are provided at least at an outer rim of the film plate.

2. The film plate according to claim 1, wherein the airbag cover has a contour of the film plate at the location of the film plate.

3. The film plate according to claim 1, wherein the film plate is embossed hot or cold.

4. The film plate according to claim 1, wherein elastically deformable hook elements are provided as the snap-in elements, which can reach beneath the airbag cover.

5. The film plate according to claim 4, wherein the hook elements have at least two hooks pointing in opposite directions.

6. The film plate according to claim 1, wherein plate elements are provided as the snap-in elements, to which snap-in noses on the airbag cover are assigned.

7. The film plate according to claim 1, wherein the film plate is attachable to the airbag cover by a clamping connection.

8. The film plate according to claim 7, wherein elastically deformable fir tree-like elements are provided as clamping elements, which can reach into corresponding openings of the airbag cover.

9. The film plate according to claim 1, wherein self-supporting rims of the film plate or plate elements can reach into corresponding slots of the airbag cover.

10. The film plate according to claim 1, wherein the mechanical connecting elements are provided in one piece at the film plate.

11. The film plate according to claim 1, wherein the film plate has a decorative element.

12. The film plate according to claim 11, wherein the film plate has a color print on its surface.

13. The film plate according to claim 11, wherein the film plate is made of decorative film.

14. The film plate according to claim 11, wherein a galvanically produced decorative element is provided.

15. The film plate according to claim 1, wherein the film plate is formed from a film that is pre-formed by deep-drawing or embossing.

16. The film plate according to claim 1, wherein the film plate is formed from a labile film that is pre-formed by deep-drawing or embossing.

17. A film plate for an airbag cover, wherein the film plate is pre-formed by deep-drawing or embossing,
    wherein the film plate can be adhered directly to the airbag cover without reinforcing elements,
    wherein the airbag cover has, at a location of the film plate, at least a partial support for the film plate.

18. The film plate according to claim 17, wherein the film plate is formed from a labile film that is pre-formed by deep-drawing or embossing.

* * * * *